United States Patent [19]
Teske et al.

[11] 3,927,774
[45] Dec. 23, 1975

[54] APPARATUS FOR DISCHARGING BULK MATERIAL FROM STORAGE TANKS

[76] Inventors: Fritz Teske, Industriestrasse 28; Lothar Teske, Industriestrasse 30, both of D-505 Porz-Westhoven, Germany

[22] Filed: Dec. 24, 1974

[21] Appl. No.: 536,212

[30] Foreign Application Priority Data
Dec. 28, 1973 Germany............................ 2364830

[52] U.S. Cl.................. 214/17 D; 222/55; 222/410
[51] Int. Cl.²........................................ B65G 65/48
[58] Field of Search ............ 214/17 D; 222/410, 55; 198/62

[56] References Cited
UNITED STATES PATENTS
3,260,382    7/1966    Klover ............................... 214/17 D
3,757,968    9/1973    Teske et al. ....................... 214/17 D

*Primary Examiner*—Robert G. Sheridan
*Attorney, Agent, or Firm*—Spencer & Kaye

[57] ABSTRACT

An apparatus for discharging bulk material from a tank has a housing situated at the lower end of the tank, a housing floor, a discharge opening in and eccentric with respect to the housing floor, a vaned impeller wheel disposed above the discharge opening and a stepping mechanism for rotating the impeller wheel through a predeterminable angle. The spacing between adjoining vanes of the impeller wheel is approximately the same as the dimensions of the discharge opening so that the impeller wheel can be in such a stationary position in which all the vanes are substantially clear of the discharge opening.

12 Claims, 5 Drawing Figures

APPARATUS FOR DISCHARGING BULK MATERIAL FROM STORAGE TANKS

BACKGROUND OF THE INVENTION

This invention relates to an apparatus for discharging bulk material from a storage tank and is of the type which includes a housing floor stationarily disposed in a housing for closing off the lower tank portion and a motor-driven impeller wheel disposed above an eccentrically arranged discharge opening provided in a housing floor.

With the aid of the above-outlined apparatus even slowly flowing or sticky bulk material such as clay can be continuously discharged. The impeller wheel may be continuously driven by a motor through a chain drive.

It is a disadvantage of the above-outlined known structures that their manufacturing and operating costs are relatively high.

SUMMARY OF THE INVENTION

It is an object of the invention to provide an improved apparatus of the afore-outlined type which has a substantially simplified structure, whereby the manufacturing and operating costs are significantly lowered.

It is a further object of the invention to provide an improved apparatus of the above-outlined type which has an increased degree of efficiency.

These objects and others to become apparent as the specification progresses, are accomplished by the invention, according to which, briefly stated, the apparatus for discharging bulk material from a tank has a housing situated at the lower end of the tank, a housing floor, a discharge opening in and eccentric with respect to the housing floor, a vaned impeller wheel disposed above the discharge opening and a stepping mechanism for rotating the impeller wheel through a predeterminable angle. The spacing between adjoining vanes of the impeller wheel is approximately the same as the dimensions of the discharge opening so that the impeller wheel can be in such a stationary position in which all the vanes are substantially clear of the discharge opening.

By virtue of the above-outlined measures provided according to the invention, the bulk material, in case of clogging in the feed, can be loosened by the impeller wheel and advanced forcibly towards the discharge opening. For this purpose, the impeller wheel is rotated through an angle corresponding to one or more vane divisions until a conveyance of the bulk material is resumed by virtue of gravity. Upon this occurrence, the then stationary impeller wheel is so positioned that its vanes are always clear of the discharge opening. This is made possible by the structural feature, according to which the distance between two adjoining vanes measured along the travelled path of the impeller wheel is about the same as the dimensions of the discharge opening, measured along the same direction. As a result, in contradistinction to apparatuses of prior art structure, there is ensured an unimpeded throughflow of the bulk material through the discharge opening. In this manner, there is ensured an increased conveying capacity and a smaller energy input as compared to known apparatuses.

DESCRIPTION OF THE PREFERRED EMBODIMENTS

Figure 1:
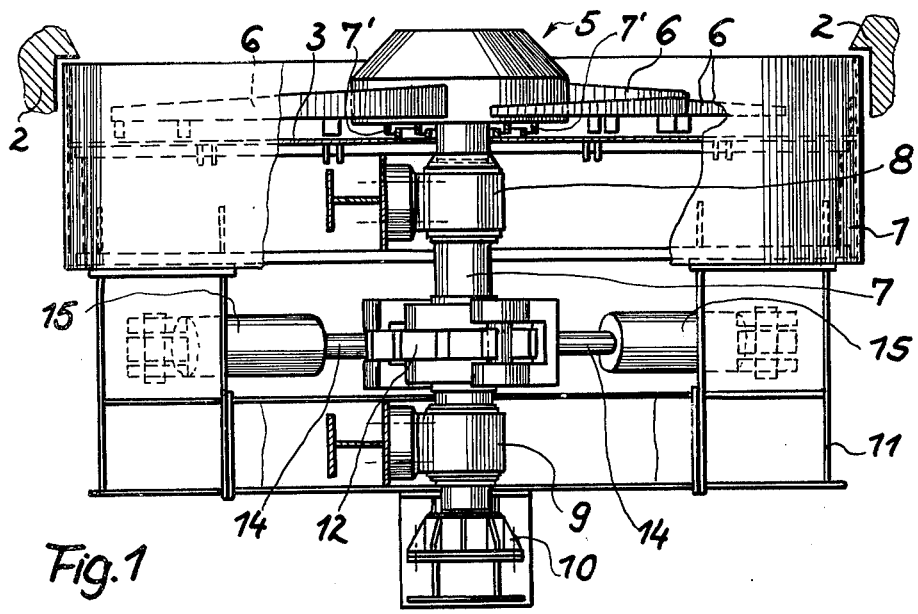
FIG. 1 is a front elevational view, partially broken away, of a preferred embodiment of the invention.
Figure 2:
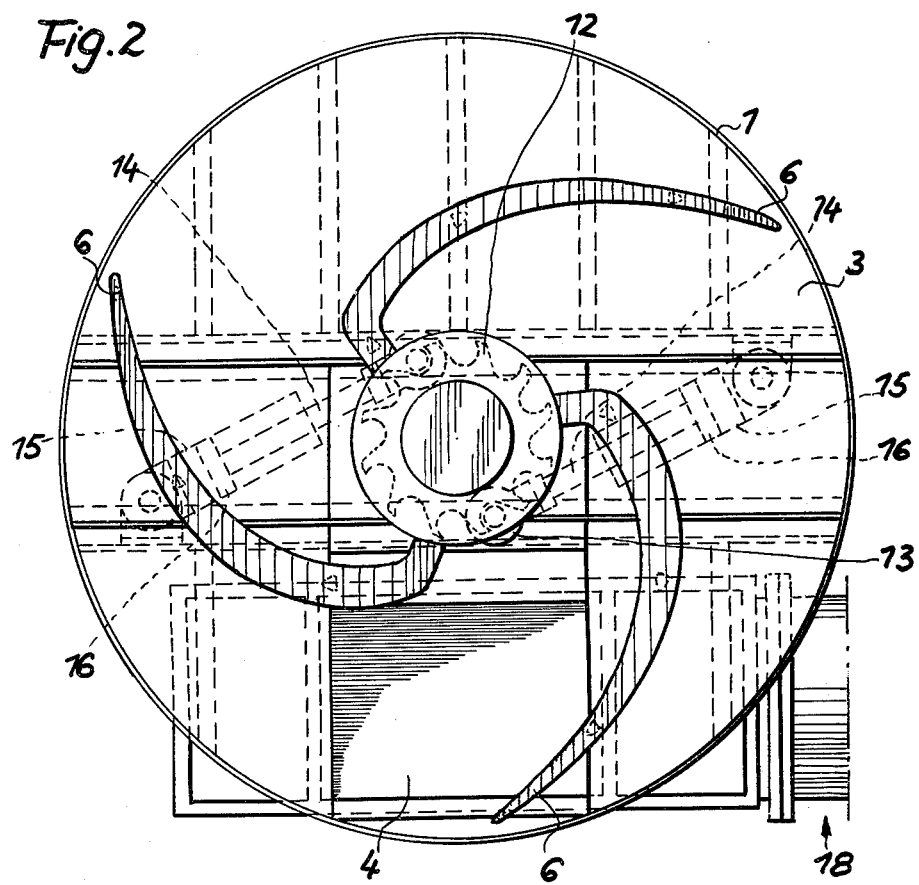
FIG. 2 is a top plan view of the same embodiment.
Figure 3:
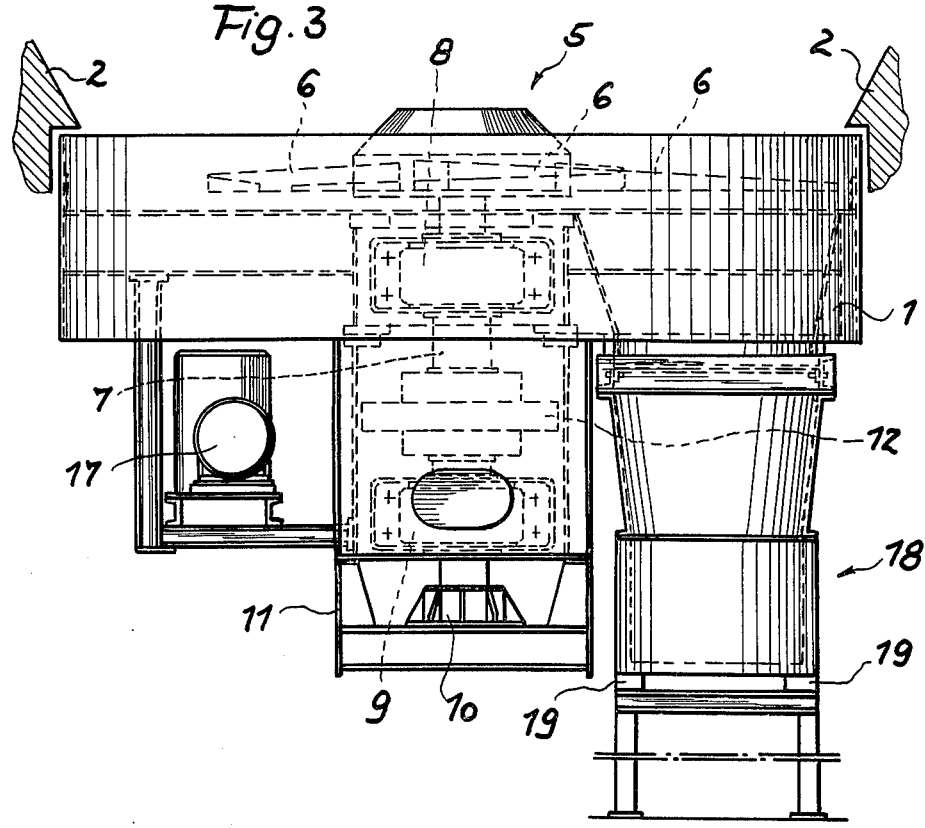
FIG. 3 is a side elevational view of the same embodiment.

Turning now to FIGS. 1 and 2, there is shown a cylindrical upright housing 1 which is secured to the lower, open, usually tapered end portion 2 of a storage tank (not shown) for accommodating bulk material. In the floor 3 of the housing 1 there is provided, in an eccentric relationship with respect to the circular floor 3, a rectangular discharge opening 4. Above the floor 3 there is rotatably supported an impeller wheel 5 having three vanes 6 which are spaced at an angle of 120° with respect to one another. The diameter of the impeller wheel 5 is only slightly smaller than that of the floor 3. The impeller wheel 5 has a vertically arranged shaft 7 which extends through a central opening in the housing floor 3. In the zone of this opening, there are provided shaft seals 7'.

For rotatably supporting the shaft 7, there are provided two radial bearings 8 and 9 and an axial bearing 10 which are secured to a frame 11. To the shaft 7, between the radial bearings 8 and 9, there is affixed a ratchet wheel 12 with which cooperate two diametrically oppositely arranged pawls 13. Each pawl 13 is attached to the free end of a separate piston rod 14 of a hydraulic power cylinder 15. The hydraulic power cylinders 15 are mounted by their terminus remote from the piston rods, to the frame 11, so that when the power cylinder 15 is charged with a pressure medium (for example, oil), the piston rods are driven outwardly. As a result, the pawls 13, projecting between two teeth of the ratchet wheel 12, move the latter and thus the shaft 7 and the impeller wheel 5 affixed thereto. The power cylinders 15 are pivotally attached to the frame 11 to be swingable about vertical axes. The stroke of each power cylinder 15 is designed in such a manner that the ratchet wheel 12 rotates through an angle of 30° per stroke so that, if the impeller wheel 5 comes to a standstill after four strokes, its vanes 6 will be positioned clear of the discharge opening 4.

The power cylinders 15 are double-acting, so that upon pressurizing that side of the piston 16 that is oriented towards the associated piston rod 14 and upon simultaneous depressurization of the other side of the piston 16, the piston rod 14 is shifted into its starting position, that is, it is withdrawn into the cylinder. To ensure that the pawls 13, upon a successive charging of the work cylinder for driving the piston rods 14 outwardly, again engage in a reliable manner the ratchet 12, the pawls 13 are continuously urged in the direction of the ratchet wheel 12 by springs (not shown) which are attached, on the one hand, to the frame 11, and, on the other hand, to the power cylinder 15. Instead of springs, cables can be used which are secured to the power cylinders 15 and which are trained about one deflecting roller each and carry counterweights at the terminus of their vertically downwardly oriented portions.

It is further feasible to use, instead of double-acting cylinders, simple power cylinders in which the return stroke is effected by means of a spring mechanism subsequent to the depressurization of the cylinder.

The control of the power cylinders 15 may be so designed that the power cylinders 15 act upon the ratchet wheel 12 in an alternating, successive manner. As a result of such an arrangement, on the one hand, there is accomplished a continuous rotary motion of the impeller wheel 5 and, on the other hand, a reverse rotation of the impeller wheel 5 is prevented with greater reliability than heretofore.

Under certain conditions, it may be particularly advantageous to design the stroke of the power cylinder 15 and that of the stepping mechanism in such a manner that the impeller wheel 5 is rotated through an angle of 120°per stroke, that is, through an angle which corresponds to the spacing between two vanes.

Under the housing floor 3 there is further arranged a motor-driven hydraulic pump 17 for energizing the power cylinders 15.

The provision of a pawl-and-ratchet device mounted on the impeller shaft under the housing floor and associated with power cylinders represents a particularly simple and robust construction according to the invention. The use of hydraulic power cylinders has the advantage over the use of electromotors conventionally finding application in this enviornment in that they are simpler in structure and even in case of small rotational speeds and small rotational angles, large torque values can be obtained. By providing a plurality of pawls that engage the ratchet wheel at peripherally uniformly distributed locations and that are driven by separate power cylinders, it is ensured that the impeller shaft and its bearing are more uniformly loaded than it was possible heretofore.

The arrangement of the stepping mechanism under the housing floor represents a particularly time-saving solution.

It is further advantageous to so design the hydraulic circuit which connects the hydraulic pump with the power cylinders that the pawls are driven in succession. In this manner it is also feasible to rotate the impeller wheel continuously.

For carrying away the bulk material passing through the discharge opening 4, there may be provided, under the discharge opening 4, for example, a continuous conveyor, such as a belt conveyor 18 which is supported on pressure-responsive sensor blocks 19. The components 19 are well-known structures and have been used, for example, in electro-mechanical scales for measuring static or quasi-static forces. A sensor 19 which may find application here is Model PR 9226/01H manufactured by Philips Elektronik Industrie GmbH, Hamburg, Germany. Instead of a belt conveyor a chain conveyor or a screw conveyor may also be used.

The sensors 19 are connected by means of conductors with a control device which is located under the housing floor 3 (for easy maintenance) and which controls the energization of the power cylinders 15. The control device ensures an optimally uniform material discharge. In case the throughput of the bulk material is too small, that is, the weight of the conveyor 18 and the weight of the bulk material disposed thereon drop below a selectable minimum value, the power cylinder 15 is energized with pressure medium so many times upon command signals from the sensors 19 until a selectable maximum weight value is reached. In case of an at least approximately constant throughput of bulk material onto the conveyor 18, the impeller vanes 6 of the impeller wheel 5 are in a stationary position clear of the discharge opening 4 and thus they do not obstruct in any way the passage of the bulk material through the discharge opening 4.

Instead of the weight responsive sensors 19, the control device may be connected with material flow sensors which respond to the material flow without being in contact therewith (for example, photocells).

It is further feasible to design the control of the power cylinders 15 in such a manner that, when the predetermined maximum throughput is exceeded at the discharge opening 4, the impeller wheel 5 is rotated from its illustrated position only through 60°to thus bring an impeller vane 6 into the zone of the discharge opening 4 and at least partially obstruct the passage of the bulk material through the discharge opening 4. This feature is particularly advantageous in case of very easily flowing bulk material.

Figure 4:
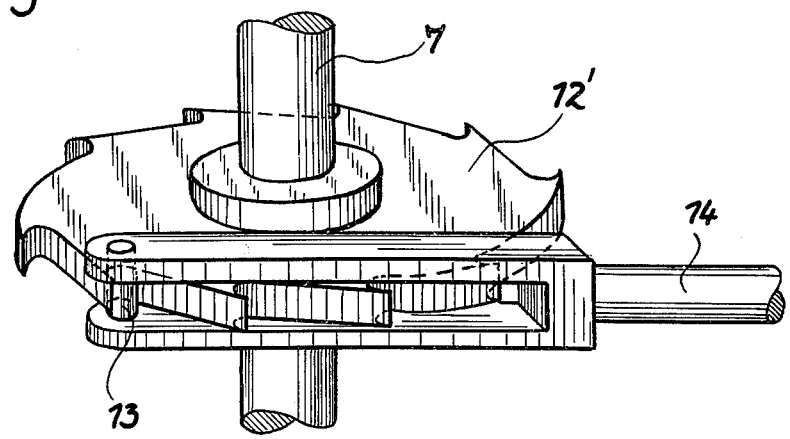
FIG. 4 is a perspective view of a modified detail of the same embodiment.

FIG. 4 illustrates a modified structure of a ratchet-and-pawl mechanism. In this structure, the ratchet wheel 12' has twelve teeth arranged uniformly about its periphery and the piston rod 14 turns the ratchet wheel 12' through an angle of 120°per stroke.

Figure 5:
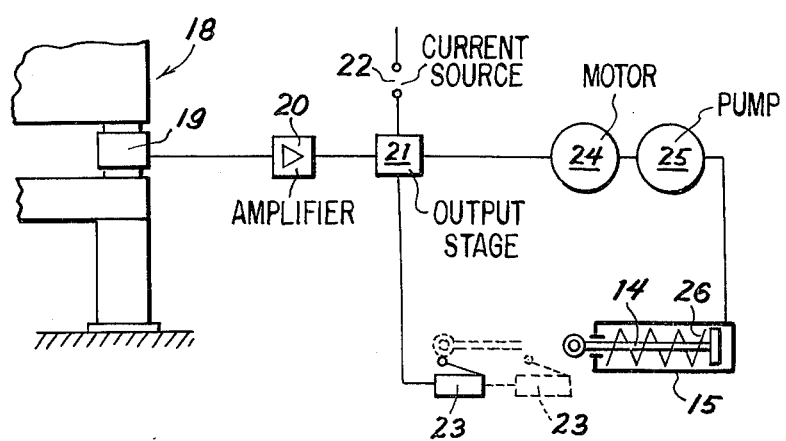
FIG. 5 is a schematic illustration of an exemplary hydraulic drive system adapted to be used for practicing the invention.

Turning now to FIG. 5, there is schematically illustrated an exemplary system for driving the ratchet 12 as a function of the weight of the bulk material on the conveyor 18.

To the weight sensor 19, operatively coupled to the conveyor 18, there is connected an amplifier 20 having an output stage 21 supplied with current from a source 22. The input side of the output stage 21 is connected to a limit switch 23 positioned to be actuated by the piston rod 14 when the latter reaches the end of its outward stroke (work stroke). The output stage controls a motor 24 of a pump 25 which, when the motor 24 runs, pressurizes one side of the power cylinder 15 to effect outward movement of the piston rod 14. Such a movement occurs against the force of a resetting spring 26 which, when the hydraulic pressure is removed from the cylinder 15, effects a withdrawal of the piston rod 14 into the cylinder 15.

When the weight measured by the sensor 19 falls below a predetermined value, the sensor 19 emits a signal which is applied to the amplifier 20 which, in turn, applies an energizing signal to the pump motor 24 through the output stage 21 of the amplifier 20. As a result, the pump 25 driven by the motor 24 pressurizes the power cylinder 15, whereupon the piston rod 14 executes a work stroke rotating the ratchet 12 to an extent that corresponds to the linear displacement of the piston rod 14. When the outward motion (work stroke) of the piston 14 reaches a predetermined maximum distance, it activates the switch 23 which, in turn, energizes a time relay (forming part of the output stage 21 of the amplifier 20) so that the piston rod 14 will dwell in its end position for a predetermined period. Thereupon a signal is emitted by the output stage 21 for deenergizing the pump motor 24 and/or depressuring (draining) the power cylinder 15. As a result, the piston rod 14 will be withdrawn into the power cylinder 15 by the compression spring 26. Thus, the pawl mechanism at the outer terminus of the piston rod 14 is ready to further rotate the ratchet 12 should the piston 14 again execute a work stroke. This cycle is repeated as long as the above-noted signal from the pressure sensor 19 is applied to the amplifier 20.

It is apparent that the position of the limit switch 23 along the piston rod 14 determines the angle through which the impeller wheel 5 rotates during and as the result, of one work stroke of the piston rod 14. It is therefore feasible to arrange the limit switch 23 slidably along the piston rod 14 to determine the work stroke thereof. If then, for example, the limit switch 23 is in its position shown in solid lines, the impeller wheel 5 will turn each time to an extent that corresponds to the distance between two adjacent vanes 6. Thus, each time the impeller wheel 5 comes to a stop upon completion of a work stroke of the piston rod 14, the vanes 6 will be substantially clear of the discharge opening 4. If, on the other hand, the limit switch 23 is shifted closed to the power cylinder 15, for example, in the phantom-line position, the impeller wheel 5 will turn each time only one half the distance between two adjacent vanes 6. Consequently, the discharge opening will be alternately blocked and cleared by the vanes 6 as the impeller wheel 5 stops upon actuation of the limit switch 23 by the piston rod 14. Instead of using a single slidable limit switch, it is feasible to provide, for example, two fixed switches spaced along the piston rod 14 and to connect the desired switch to the output stage 21 of the amplifier 20.

The system described in connection with FIG. 5 may be further modified by providing, instead of the weight sensor 19, a photocell which emits a signal, for example, when the level of the bulk material in the conveyor 18 falls below a predetermined height. Also, instead of the return spring 26, a double-acting cylinder 15 with conventional switch valves may be provided for effecting both the work stroke and the return stroke of the piston rod 14 by hydraulic pressure.

It will be understood that the above description of the present invention is susceptible to various modifications, changes and adaptations, and the same are intended to be comprehended within the meaning and range of equivalents of the appended claims.

We claim:

1. In an apparatus for discharging bulk material from storage tanks, including a housing adjoining an open lower end of the storage tank; a housing floor disposed in the housing; means defining a discharge opening in the housing, the discharge opening being eccentric with respect to the housing floor; and an impeller wheel disposed in the housing above the discharge opening, the improvement comprising in combination:
   a. a plurality of vanes forming part of said impeller wheel, the clearance between any two adjacent vanes measured along their path of travel being at least approximately equal to the dimensions of said discharge opening measured along said path of travel; and
   b. a stepping mechanism for rotating said impeller wheel through angles of predetermined magnitude, said stepping mechanism having means for stopping said impeller wheel in a position in which said vanes are substantially clear of said discharge opening.

2. An apparatus as defined in claim 1, wherein said stepping mechanism is disposed below said housing floor.

3. An apparatus as defined in claim 1, wherein said stepping mechanism includes a pawl-and-ratchet device, the ratchet wheel of the pawl-and-ratchet device being secured to said impeller wheel.

4. An apparatus as defined in claim 3, further including an impeller shaft to which said impeller wheel is fastened, said impeller shaft passing through said housing floor; said ratchet wheel being affixed to said shaft below said housing floor; and power cylinder means connected to a pawl of said pawl-and-ratchet device for driving said pawl.

5. An apparatus as defined in claim 4, said pawl-and-ratchet device including a plurality of pawls, said power cylinder means including a plurality of power cylinders, each pawl being connected to and driven by a separate one of said power cylinders, said pawls engaging said ratchet wheel at locations uniformly spaced along the periphery of said ratchet wheel.

6. An apparatus as defined in claim 1, said pawl-and-ratchet device including a plurality of pawls; the improvement further comprising means for driving said pawls in succession.

7. An apparatus as defined in claim 1, said stepping mechanism including means for stopping said impeller wheel in a position in which one of said vanes is disposed over said discharge opening.

8. An apparatus as defined in claim 1, further comprising means for moving said ratchet wheel by said pawl, and during one stroke thereof, through an angle that is smaller than the spacing between two adjoining vanes on said impeller wheel.

9. An apparatus as defined in claim 1, said power cylinder means including a cylinder; a piston reciprocating in said cylinder; and a piston rod having one end attached to said piston and another end attached to said pawl.

10. An apparatus as defined in claim 1, further comprising control means for at least indirectly sensing the flow of the bulk material through said discharge opening and for controlling said stepping mechanism as a function of the flow of the bulk material through said discharge opening, said control means being disposed below said discharge opening.

11. An apparatus as defined in claim 10, said control means including weighing means disposed below said discharge opening for weighing at least intermittently the bulk material passing through said discharge opening.

12. An apparatus as defined in claim 11, further including a continuous conveyor disposed below said discharge opening for carrying away the bulk material that passed through said discharge opening; and weight sensing blocks supporting said conveyor, said control device controlling said stepping mechanism as a function of the momentary weight of said bulk material on said conveyor.

* * * * *